US 8,489,712 B2

(12) United States Patent
Kruk et al.

(10) Patent No.: US 8,489,712 B2
(45) Date of Patent: Jul. 16, 2013

(54) IDENTIFICATION AND/OR ADDRESSING OF A DATA TERMINAL DEVICE OF A LOCAL NETWORK

(75) Inventors: Anton Kruk, Hamminkeln (DE); Volker Mösker, Isselburg (DE)

(73) Assignee: Gigaset Communications GmbH, Munich (DE)

(*) Notice: Subject to any disclaimer, the term of this patent is extended or adjusted under 35 U.S.C. 154(b) by 458 days.

(21) Appl. No.: 12/678,435

(22) PCT Filed: Sep. 25, 2008

(86) PCT No.: PCT/EP2008/062837
§ 371 (c)(1),
(2), (4) Date: Jun. 8, 2010

(87) PCT Pub. No.: WO2009/053208
PCT Pub. Date: Apr. 30, 2009

(65) Prior Publication Data
US 2010/0299413 A1    Nov. 25, 2010

(30) Foreign Application Priority Data

Sep. 25, 2007  (EP) .................................... 07018849

(51) Int. Cl.
*G06F 15/177* (2006.01)
*G06F 15/173* (2006.01)
*G06F 15/16* (2006.01)

(52) U.S. Cl.
USPC ........... 709/220; 709/221; 709/223; 709/229; 709/242; 709/245

(58) Field of Classification Search
USPC ........................................................ 709/220
See application file for complete search history.

(56) References Cited

U.S. PATENT DOCUMENTS 7,633,948 B2 * 12/2009 Yokomitsu et al. ...... 370/395.54

2001/0032258 A1 * 10/2001 Ishida et al. .................. 709/224

(Continued)

FOREIGN PATENT DOCUMENTS

EP        1345381 B1    10/2006

OTHER PUBLICATIONS

International Written Opinion, PCT2008/062837, dated Mar. 30, 2009, 6 pages.

(Continued)

Primary Examiner — Richard G Keehn
(74) Attorney, Agent, or Firm — Senniger Powers LLP

(57) ABSTRACT

The invention relates to identifying and/or addressing a data terminal device (DEE1) of a local network (LNW, LAN, W-LAN, Ethernet, Powerline) such that address/identification information (AID-INF3) of the data terminal device of the local network is available to a user of the local network in a simple and comfortable manner, wherein the data terminal device registers with a terminal system (ESY) due to a triggering event (ALE), indicated for example, by the URL 'www.mygigaset.com' and present, for example, in a large area network (GNW, WAN, MAN, INTERNET), and transmits thereto address/identification information, for example modifiable information (AID-INF1), referencing the local network and the large area network. Said address/identification information is stored by the terminal system. Subsequently, in a further data terminal device (DEE2) of the local network, the URL 'www.mygigaset.com' is entered into the terminal system, a connection is established with the terminal system, and address/identification information, for example modifiable information (AID-INF2), referencing the large area network is transmitted. The terminal system compares the transmitted address/identification information (AID-INF1, AID-INF2) to each other, and transmits to the further data terminal device a part of the address/identification information (AID-INF1) referring back to the local network as the address/identification information (AID-INF3) of the data terminal device (DEE1), because both data terminal devices are present in the same local network, in order that said data terminal device can communicate directly with the data terminal device (DEE1).

18 Claims, 2 Drawing Sheets

U.S. PATENT DOCUMENTS

| | | | |
|---|---|---|---|
| 2002/0016846 A1* | 2/2002 | Ono | 709/229 |
| 2002/0016858 A1* | 2/2002 | Sawada et al. | 709/238 |
| 2002/0040397 A1 | 4/2002 | Choi | |
| 2003/0105841 A1* | 6/2003 | Miyake et al. | 709/220 |
| 2003/0137974 A1* | 7/2003 | Kwan et al. | 370/352 |
| 2003/0177236 A1* | 9/2003 | Goto et al. | 709/225 |
| 2004/0111640 A1* | 6/2004 | Baum | 713/201 |
| 2004/0199623 A1* | 10/2004 | Houri | 709/223 |
| 2005/0038865 A1* | 2/2005 | Noda et al. | 709/213 |
| 2005/0122903 A1* | 6/2005 | Hultgren et al. | 370/230 |
| 2006/0224704 A1* | 10/2006 | Parikh et al. | 709/220 |
| 2008/0104241 A1* | 5/2008 | Kodama et al. | 709/225 |
| 2008/0207181 A1* | 8/2008 | Jiang | 455/414.1 |

OTHER PUBLICATIONS

International Preliminary Report on Patentability, PCT2008/062837, dated Apr. 27, 2010, 7 pages.

International Search Report, PCT2008/062837, dated Mar. 30, 2009, 4 pages.

* cited by examiner

IDENTIFICATION AND/OR ADDRESSING OF A DATA TERMINAL DEVICE OF A LOCAL NETWORK

REFERENCE TO RELATED APPLICATIONS

This application claims priority to European application 07018849.5 filed Sep. 25, 2007.

FIELD OF THE INVENTION

The invention relates to a method for the identification and/or addressing of a data terminal of a local network according to the preamble of Patent Claim 1, a terminal system for identification and/or addressing of a data terminal of a local network according to the preamble of Patent Claim 16 and a data terminal of a local network for its identification and/or addressing according to the preamble of Patent Claim 32.

BACKGROUND OF THE INVENTION

The discovery or the identification/addressing of devices in a local network, e.g. telephones in a home network, is often a problem in the case of the dynamic assignment of address/identification information items, e.g. IP addresses (Internet Protocol), as a user of the network does not know the current IP address of the device and this can change after every new switch on/new connection to the network. In order to configure a device of this type via a website, e.g. by means of a browser-capable personal computer, the addressing is important and necessary, however.

Currently, there are in principle three known possibilities to solve this problem:
  (I) The device has a display and can display its own IP address.
  (II) The device makes its name, which is preferably of a symbolic nature, known at a server (DHCP server) by means of a request, the so-called DHCP request (Dynamic Host Configuration Protocol), and the DHCP server then shares this name with a "Domain Name Server" of a "Domain Name System (DNS)" in the local network for realising a DNS service.
  (III) The device supports a UPnP profile (Universal Plug and Play) and sends regular "broadcasts". A personal computer for example is in the position to identify and address the device on the basis of these "broadcasts".

The possibilities specified are quite unsatisfactory for small devices, however, particularly those without a display, as solution (I) is already fundamentally discounted for devices without a display, Solution (II) depends very strongly on the extent to which a gateway/router is suitable for supporting this service as an interface between the local network and the large area network, and Solution (III) entails a not inconsiderable implementation outlay, in addition it is quite demanding in terms of memory resources and furthermore is also subject to licensing.

SUMMARY OF THE INVENTION

The object on which the invention is based consists in identifying and/or addressing a data terminal of a local network in such a manner that address/identification information items of the data terminal of the local network are made available to a user of the local network in a simple and convenient manner.

This object is achieved starting from
  (i) the method defined in the preamble of Patent Claim 1 by means of the features in the characterising part of Patent Claim 1,
  (ii) the terminal system defined in the preamble of the subsequent "terminal system" claim by means of the features in the body of that claim,
  (iii) the data terminal defined in the preamble of the subsequent "data terminal" claim by mans of the features in the body of that claim,
  (iv) by at least one of the Method Claims by means of a terminal system according to the "terminal system" claims and
  (v) by at least one of the Method Claims by means of a data terminal as subsequently claimed.

The idea on which the invention is based consists in the fact that, due to a triggering event, e.g. an internal/external "trigger", a device in a local network logs on to a server, which is represented by the URL "www.mygigaset.com" for example and is located in a large area network, e.g. the Internet, for example, and transmits a data record to the server in the form of e.g. changeable address/identification information items, e.g. an internal and external IP address, which refers to the local network and the large area network. This transmitted data record is saved by the server. If the user of the local network would then like to localise the device in the local network and e.g. find out the IP address of the device for device configuration, then they enter the URL "www.mygigaset.com" of the server on a data terminal of the local network, e.g. in the browser of their personal computer, and create a connection to the server. The request of the browser then goes to the server, the latter looks in its database and, as the personal computer has the same external IP address as the device (as both are located in the same local network), the server can then direct the browser to the internal IP address of the device by means of a simple "redirect".

This procedure according to the invention has the advantage that the specified URL "www.mygigaset.com" can then be printed in all operating manuals of the device, as a result of which every user of the local network can discover/identify/address their device by means of the printed URL "www.mygigaset.com". This principle functions in the case of every one of a plurality of devices which are present in a local network.

Should a plurality of devices which should all use this mechanism be present in the local network, then it makes sense, in addition to the internal and external IP address, to transfer additional data for identification, e.g. a symbolic name (user name and/or password), a MAC address, etc. This additional information transmitted from the server to the browser or the personal computer can then be shown by means of the browser on an intermediate page which allows the user of the local network to select the device which they would like to discover/identify/address.

It is also advantageous that the device recognises an external IP address change in the local network (further triggering event) and then sends an update of its logon/registration to send to the server. This is achieved however e.g. when using the "Voice over Internet Protocol (VoIP)" service by using the STUN [Simple Traversal of User Datagram Protocol (UDP) over Network Address Translation (NAT)] mechanism.

Furthermore, it is advantageous from the points of view of security if a timeout, e.g. a temporal recurrence interval of 24 hours, is provided for the access to the server (further triggering event), according to which the device in the local network has an update of its logon/registration to the server.

Further advantageous developments of the invention are specified in the remaining subclaims, as well as in the following exemplary embodiment of the invention.

BRIEF DESCRIPTION OF THE FIGURES

An exemplary embodiment of the invention is explained with the aid of FIGS. 1 and 2. In the figures.

DETAILED DESCRIPTION OF PREFERRED EMBODIMENTS

This application claims priority to European application 07018849.5 filed Sep. 25, 2007, the entire disclosure of which is expressly incorporated by reference.

Figure 1:
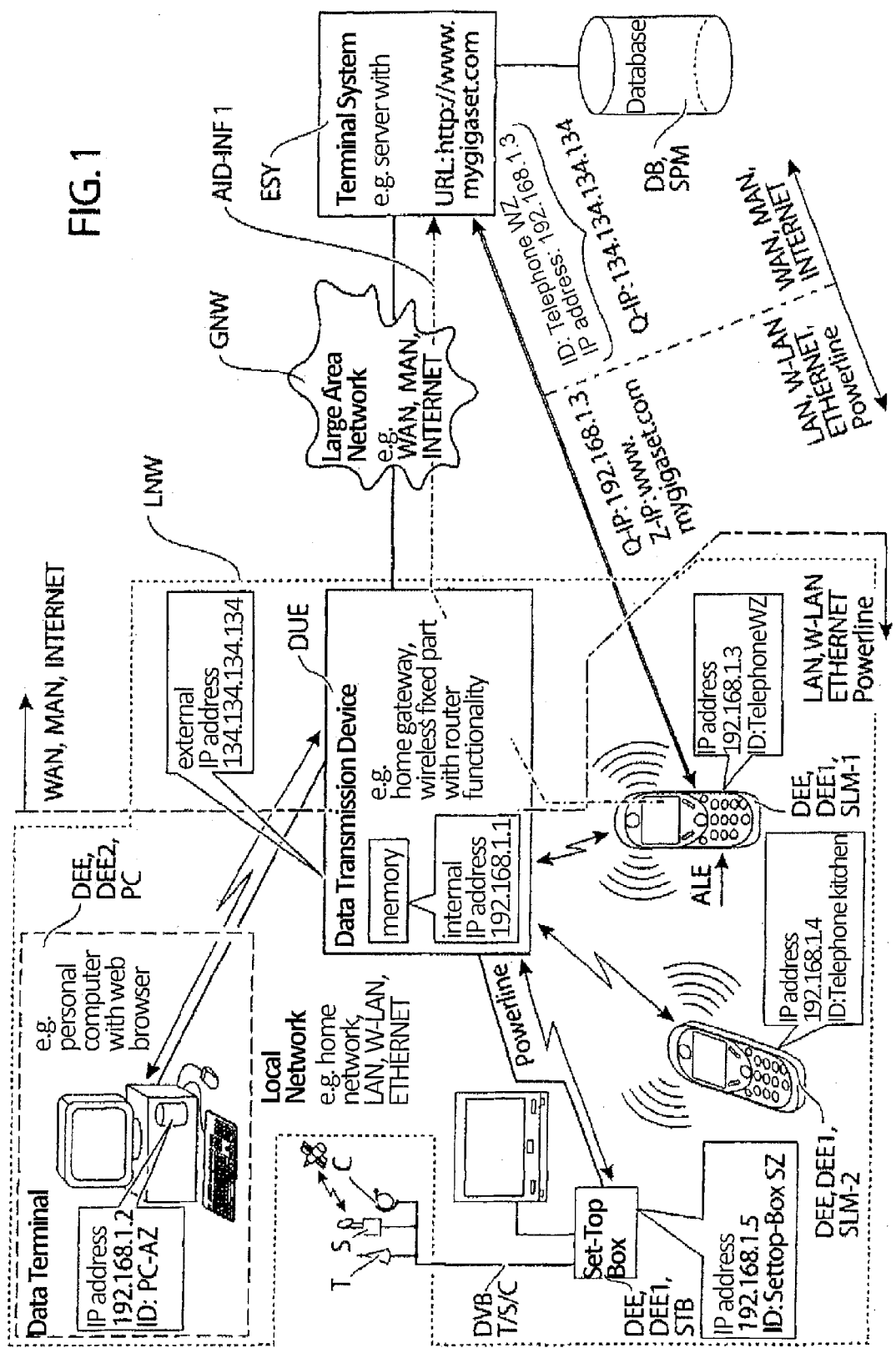
FIG. 1 shows an arrangement/scenario for discovering, identifying and/or addressing a data terminal in a local network.

FIG. 1 shows an arrangement/scenario for discovering, identifying and/or addressing a data terminal DEE, DEE1, DEE2 in a local network LNW which can be configured as local area network (LAN), wireless local area network (W-LAN) or Ethernet or powerline supported. The local network LNW is preferably connected as a home network to a large area network GNW which is for example configured as a wide area network (WAN), metropolitan area network (MAN) or INTERNET, wherein the linking takes place via a data transmission device DÜE of the local network LNW.

A terminal system ESY, which is designated as a server with a universal resource locator URL "http://www.mygigaset.com" in the large area network GNW and has a database DB as memory means SPM for saving server user data, is for example assigned to the large area network GNW, which is preferably configured as the Internet according to FIG. 1. Alternatively to the scenario shown in FIG. 1, in which the terminal system ESY is assigned to the large area network GNW, it is also possible to integrate the terminal system ESY into the data transmission device DÜE of the local network LNW.

The local network LNW comprises a plurality of data terminals DEE, DEE1, DEE2 (three first data terminals DEE1 and a second data terminal DEE2 in the exemplary embodiment shown), in addition to the data transmission device DÜE. The data transmission device DÜE, "gateway" of the local network LNW to the Internet and formed in terms of this function as a home gateway, a wireless fixed part with router functionality, has among other things, in addition to the units normally present for this purpose but not shown, a memory SP for storing address and identification information items, e.g. Internet Protocol addresses (IP addresses) as well as authentication data such as the password, user name and MAC address, etc.

Of the three first data terminals DEE1, two first data terminals DEE1 are wireless portable parts SLM-1, SLM-2, which form a telephone system with the data transmission device DÜE for wireless, particularly VoIP-based (Voice over Internet Protocol), telephoning, and a further first data terminal DEE1, formed as a set-top box, which forms an IPTV system in combination with the data transmission device DÜE (wireless or wired) and a television set FA. Furthermore, the set-top box is also suitable, depending on the configuration, for the receiving of terrestrial, satellite- or cable-supported DVB (Digital Video Broadcast) signals.

In addition to the listed devices, any number of other devices, thus e.g. a fax device, a printing device, a television set, a hi-fi system, a wired telephone, etc., can be arranged as first data terminals DEE1 in the local network LNW and connected to the Internet via the data transmission device DÜE.

The second data terminal DEE2, which is preferably configured as a personal computer, a notebook or laptop or a "personal digital assistant (PDA)" with one web browser in each case, has, via the data transmission device DÜE, wireless or wired access to the large area network GNW or to the Internet and therefore to the terminal system ESY or the server. The access to the Internet and in particular to the terminal system ESY takes place in a known manner in that the user of the second data terminal DEE2 enters a "universal resource locator (URL)", thus e.g. the URL "http://www.mygigaset.com", into the web browser via a user interface e.g. keyboard, touch panel, etc., which is not shown.

In the local network LNW, the data terminals DEE and the data transmission device DÜE are assigned so called IP addresses for the internal and external "Internet Protocol (IP)"-based communication addresses, so-called IP addresses and, if appropriate, for better identification and authentication in the case of a plurality of data terminals in the local network, are assigned identification/authentication data configured as identities or identifiers ID, such as e.g. the passwords, user names, MAC addresses, etc. already mentioned. Both the IP addresses and the identifiers ID are (as in the case of the data transmission device DUE) stored in satisfactory memories (not explicitly shown up to the personal computer in the FIGURE). A possible distribution of the IP addresses and identifiers ID within the local network LNW in the scenario shown looks like the following:

Data transmission device
Internal IP address 192.168.1.1
External IP address 134.134.134.134
First data terminal (wireless portable part SLM-1)
IP address 192.168.1.3
ID: Telephone WZ (living room)
First data terminal (wireless portable part SLM-2)
IP address 192.168.1.4
ID: Telephone kitchen
First data terminal (set-top box STB)
IP address 192.168.1.5
ID: Set-top box SZ (bedroom)
Second data terminal (personal computer PC)
IP address 192.168.1.2
ID: PC-AZ (study)

If the operator/user of the local network LNW would then like to configure the wireless portable part SLM-1 with the aid of the personal computer PC, then they require the IP address which may not be known to them, because this is changeable (e.g. after every new switch on/new connection to the network), and the identifier ID of the wireless portable part SLM-1.

The wireless portable part SLM-1 now behaves in accordance with the sense of the invention and transmits address/identification information items, designated as first address/identification information items AID-INF1 in the following, to the server ESY assigned to the large-area network GNW on the basis of a triggering event ALE via the wireless fixed part or the home gateway DÜE. During transmission, the first address/identification information items AID-INF1 essentially comprise a source IP address "Q-IP: 192.168.1.3", the identifier "ID: Telephone WZ" and a target IP address "Z-IP: www.mygigaset.com" on the local network side and the source source IP address of the wireless fixed part or home gateway "Q-IP: 134.134.134.134", behind which the source IP address "Q-IP: 192.168.1.3" and the identifier "ID: Telephone WZ" hide, on the large area network side.

The triggering event is preferably determined by a first registration of the wireless portable part SLM-1 in the local network LNW at the server ESY, a temporal recurrence interval in the course of a registration update of the wireless portable part SLM-1 in the local network LNW at the server ESY and/or changing of the first address/identification information items AID-INF1.

Figure 2:
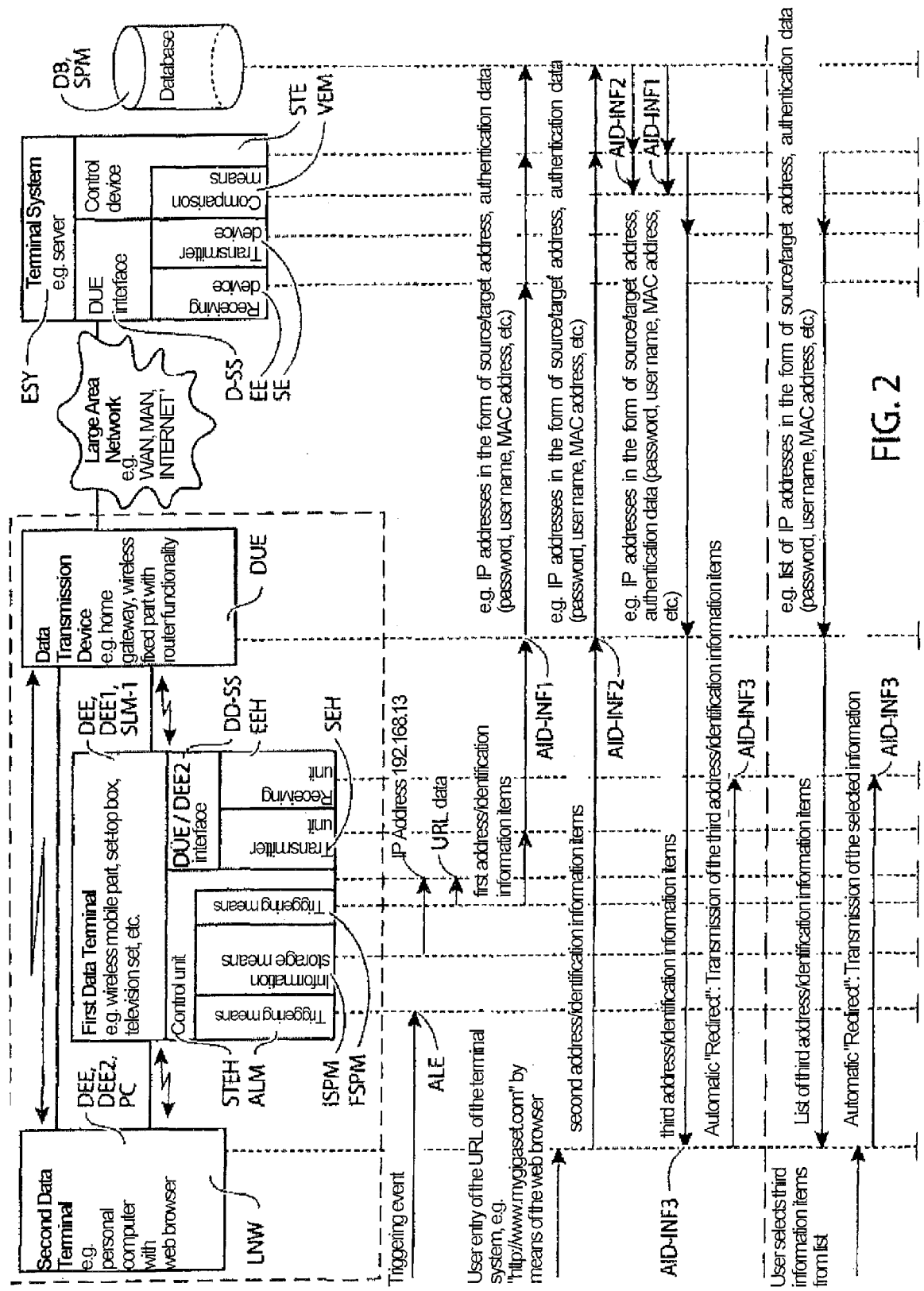
FIG. 2 shows an information flow diagram for discovering, identifying and/or addressing the data terminal in the local network for the arrangement/scenario according to FIG. 1.

FIG. 2 shows an information flow diagram for discovering, identifying and/or addressing the data terminal DEE in the local network LNW for the arrangement/scenario according to FIG. 1. The information flows necessary for this (a), (b), (c) proceed in accordance with FIG. 2

(a) between the first data terminal DEE1 or the wireless portable part SLM-1 and the data transmission device or the wireless fixed part DÜE, connected wirelessly or in a wired manner to the first data terminal DEE1 or the wireless portable part SLM-1, and the terminal system or server ESY connected to the data transmission device or the wireless fixed part DÜE via the large area network GNW, (b) between the second data terminal DEE2 or the personal computer PC and the data transmission device or the wireless fixed part DÜE, connected wirelessly or in a wired manner to the second data terminal DEE2 or the personal computer PC, and the terminal system or server ESY connected to the data transmission device or the wireless fixed part DÜE via the large area network GNW, and (c) between the second data terminal DEE2 or the personal computer PC and the first data terminal DEE1 or the wireless portable part SLM-1.

The components of the first data terminal DEE1 or the wireless portable part SLM-1 and the terminal system or server ESY taken into account for the display of the information flows are (i) for the first data terminal DEE1 or the wireless portable part SLM-1, a control unit STEH with assigned triggering means ALM, information storage means ISPM and an assigned read only memory module FSPM, as well as a common data transmission device/data terminal interface DD-SS, acting between the data transmission device or the wireless fixed part DÜE and the first data terminal DEE1 or the wireless portable part SLM-1, with an assigned transmitter unit SEH and an assigned receiving unit EEH, which are connected to one another in the manner shown, and (ii) for the terminal system or the server ESY with the assigned memory means SPM or the assigned database DB, a control device STE with assigned comparison means VEM, as well as a data transmission device interface D-SS, effective to the data transmission device or to the wireless fixed part DÜE, with an assigned transmitter device SE and an assigned receiving device EE, which are connected to one another in the manner shown.

The information flow (a) begins in that in the first data terminal DEE1 or the wireless portable part SLM-1, by the triggering means ALM of the control unit STEH, the triggering event ALE mentioned with reference to FIG. 1 is detected or it is determined whether the triggering event ALE is present. If this is the case, then both the IP address stored in the information storage means ISPM and hitherto currently assigned to the first data terminal DEE1 and/or the wireless portable part SLM-1, e.g. the IP address 192.168.1.3 according to FIG. 1, and also the URL data stored in the read only memory module FSPM and referencing the terminal system and the server ESY are then read out by the control unit STEH and forwarded to the transmitter unit SEH. For the case that an identifier ID, e.g. the identifier ID "ID: Telephone WZ" according to FIG. 1 is also saved in the information storage means ISPM, then this is also read out by the control unit STEH and forwarded to the transmitter unit SEH.

Thereafter, the IP addresses and, if appropriate, the identifier ID are transmitted as the source IP address and the URL data is transmitted as the target IP address by the transmitter unit SEH to the data transmission device or to the wireless fixed part DÜE, where, essentially together with the source IP address "Q-IP: 134.134.134.134" of the data transmission device or the wireless fixed part DÜE, they form the first address/identification information items AID-INF1 which are transmitted by the data transmission device or the wireless fixed part DÜE to the terminal system or the server ESY. In the terminal system or server ESY, the first address/identification information items AID-INF1 are saved in the database DB or in the memory means SPM by means of the receiving device EE and the control device STE. With that, the information flow (a) is ended.

In the case of information flow (b), the URL "http://www.mygigaset.com" of the terminal system or server ESY is first entered into the web browser by the user/operator of the local network LNW on the second data terminal DEE2 or the personal computer PC via the user interface, e.g. keyboard, in order to access the terminal system or the server ESY from the second data terminal DEE2 or the personal computer PC.

For this access, in addition to this URL data, the IP address hitherto currently assigned to the second data terminal DEE2 or the personal computer PC, e.g. the IP address 192.168.1.2 according to FIG. 1, is read out of a memory of the second data terminal DEE2 or the personal computer PC in a manner not visible for the user/operator, that is to say in the background, and in the event that an identifier ID, e.g. the identifier ID "ID:PC-AZ" according to FIG. 1, is also stored in the memory, this is also read out.

Thereafter, as in the case of information flow (a), the IP address and, if appropriate, the identifier ID are transmitted as the source IP address and the URL data is transmitted as the target IP address to the data transmission device or to the wireless fixed part DÜE, where, essentially together with the source IP address "Q-IP: 134.134.134.134" of the data transmission device or the wireless fixed part DÜE, they form the second address/identification information items AID-INF2 which are transmitted by the data transmission device or the wireless fixed part DÜE to the terminal system or the server ESY. In the terminal system or server ESY, the second address/identification information items AID-INF2 are then also saved in the database DB or in the memory means SPM by means of the receiving device EE and the control device STE.

With the transmitted second address/identification information items AID-INF2, the terminal system or the server ESY is advised either directly (by means of the second address/identification information items AID-INF2) or indirectly (by means of disclosure information added to the second address/identification information items AID-INF2 themselves) that the terminal system or the server ESY should transmit third address/identification information items AID-INF3 to the second data terminal DEE2 or the personal computer PC, which third address/identification information items specifies which data terminals DEE with which IP addresses and, if appropriate, identifiers ID likewise belong to the local network (that is to say data terminals are identified in the local network LNW).

All of the first address/identification information items AID-INF1 and the second address/identification information items AID-INF2 stored in the database DB are therefore read out by the control device STE of the terminal system or the server ESY and loaded into the comparison means VEM assigned to the control device STE.

The comparison means in each case compare the first address/identification information items with the second address/identification information items AID-INF2. As the first and second address/identification information items AID-INF1, AID-INF2 in each case have an identical information part, in particular the URL data and the external IP address of the data transmission device DÜE, and a non-identical information part, in particular the IP address and if appropriate the identifier ID of the data terminal, third address/identification information items AID-INF3 are created as a comparison result from the non-identical information parts of the first address/identification information items AID-INF1, which third address/identification information items corresponds, in the sense of the specified identification aspect, to that which should be transmitted to the second data terminal DEE2 or the personal computer PC.

Depending on whether there is then single first address/identification information items AID-INF1 or a plurality of first address/identification information items AID-INF1, single third address/identification information items AID-INF3 and a plurality of listed third address/identification items AID-INF3 are transmitted to the second data terminal DEE2 or the personal computer PC via the data transmission device or the wireless fixed part DÜE. With that, the information flow (b) is ended.

The information flow (c) now only consists in the fact that with the transmitted third address/identification information items AID-INF3, the second data terminal DEE2 or the personal computer PC creates a connection, in the sense of an automatic "redirect" to the first data terminal DEE1 corresponding to the third address/identification information items AID-INF3 or the wireless portable part SLM-1 (that is to say addresses it) and transmits the third address/identification information AID-INF3 to the first data terminal DEE1 or the wireless portable part SLM-1 via the receiving unit EEH. After the first data terminal DEE1 or the wireless portable part SLM-1 has therefore been identified and addressed, it can now for example, as mentioned at the beginning, be configured from the second data terminal DEE2 or the personal computer PC.

In the case of the listed third address/identification information items AID-INF3, the user must first select third address/identification information items AID-INF3 from the list, before (as stated previously) a connection to the first data terminal corresponding to the selected third address/identification information AID-INF3 is created from the second data terminal DEE2 or the personal computer PC and the first data terminal can then also be configured again. With that, the information flow (C) is ended.

The invention claimed is:

1. A method for identification and/or addressing of a data terminal of a local network, in which the local network is connected via a data transmission device to a large area network and at least two data terminals of the local network are connected as "client" to a terminal system assigned to the large area network as server via the data transmission device comprising:

a) on the basis of a triggering event, at least one first data terminal transmitting, in particular changeable, first address/identification information items referencing a local network address and a large area network address to the terminal system storing the transmitted first address/identification information, wherein said transmitted first address/identification information items are items generated by using a source IP address of the data transmission device, b) a second data terminal transmitting, in particular changeable, second address/identification information items referencing a large area network address to the terminal system with which information items the terminal system is advised to create third address/identification information items for the local network and to transmit these to the second data terminal, wherein said transmitted second address/identification information items are items generated by using a source IP address of the data transmission device, c) to determine the third address/identification information items, the terminal system comparing the received second address/identification information items with the stored first address/identification information items, d) if the comparison reveals that a corresponding part of the saved first address/identification information items to the second address/identification information exists, the terminal system transmitting a part of the first address/identification information items which can be traced back to the local network to the second data terminal as the third address/identification information items to be determined, e) with the part of the first address/identification information items transmitted as the third address/identification information items, the second data terminal communicates directly with the first data terminal using the third address/identification information items received from the terminal system.

2. Method according to claim 1, wherein the terminal system is integrated in the data transmission device.

3. Method according to claim 1, wherein the triggering event is determined by a first registration of the first data terminal in the local network at the terminal system.

4. Method according to claim 1 wherein the triggering event is determined by a temporal recurrence interval in the course of a registration update of the first data terminal in the local network at the terminal system.

5. Method according to claim 1 wherein the triggering event is determined by a changing of the first address/identification information items.

6. Method according to claim 1, wherein Internet Protocol addresses in the form of source/target addresses and authentication data, particularly a password, a user name or a MAC address are used as the first to the third address/identification information items.

7. Method according to claim 1 wherein a web server with a user-specific database is used as the terminal system in the large area network configured as the Internet.

8. A terminal system for identification and/or addressing of a data terminal of a local network with a data transmission device interface to a data transmission device of the local network, wherein the terminal system assigned to a large area network and configured as a server can be connected, via the data transmission device interface and the data transmission device, to at least two data terminals of the local network, configured as "clients" comprising:

a) a receiving device of the data transmission device interface and a control device with assigned memory are present, which are configured and connected to one another in such a manner that a1) first address/identification information items, which are items generated by using a source IP address of the data transmission device, are transmitted by a first data terminal on the basis of a triggering event and reference a local network address and a large area network address and are in particular changeable, are received and saved in the memory and a2) second address/identification information items, which are items generated by using a source IP address of the data transmission device, are transmitted by a second data terminal and reference a large area network address and are in particular changeable, are received and are stored in a temporarily cached manner in the memory for determining third address/identification information items for the local network and transmission of the third address/identification information items to the second data terminal, b) for determining the third address/identification information items, a transmitter device of the data transmission device interface and the control device with the assigned memory and [a] comparison means are present, which are configured and connected to one another in such a manner that b1) the received cached second address/identification information items are compared with the stored first address/identification information items, c) the comparison reveals that a corresponding part of the saved first address/identification information items to the second address/identification information items exists, a part of the first address/identification information items which can be traced back to the local network is transmitted as the third address/identification information items is transmitted to the second data terminal so that the latter communicates directly with the first data terminal using the third address/identification information items received from the terminal system.

9. Terminal system according to claim 8, wherein the local network is configured wirelessly.

10. Terminal system according to claim 9, wherein a wireless fixed part with router functionality is configured as the data transmission device.

11. Terminal system according to claim 10, wherein a wireless portable part or mobile telephone with "Voice over Internet Protocol" functionality is configured as the first data terminal.

12. Terminal system according to claim 8, wherein the local network is configured in a wired manner.

13. Terminal system according to claim 12, wherein a "home gateway" is configured as the data transmission device.

14. Terminal system according to claim 13 wherein a fax device, a printing device, a set-top box, a television set or a hi-fi system is configured as the first data terminal.

15. Terminal system according to claim 13 wherein a personal computer, notebook/laptop or a "personal digital assistant" with a web browser is configured as the second data terminal.

16. A data terminal of a local network for identification and/or addressing with a data transmission device/data terminal interface to a data transmission device and a further data terminal of the local network, wherein the data terminal configured as a "client" can be connected to the further data terminal, configured as a "client", of the local network by using the data transmission device/data terminal interface and to a terminal system, wherein the terminal system is assigned to a large area network and configured as a "server", by using the data transmission device/data terminal interface and the data transmission device comprising:

a physical transmitter unit and a physical receiving unit of the data transmission device/data terminal interface, and a physical control unit comprising an associated triggering means and information storage and an associated read only memory module wherein the transmitter unit, the receiving unit, and the control unit are configured and connected to one another in such a manner that:

on the basis of a triggering event determined by the triggering means, first address/identification information items being items generated by using a source IP address of the data transmission device, which reference a local network address and a large area network address, is changeable in particular and is saved in the information storage, are transmitted to the terminal system, which can be addressed by using "Universal Resource Locator" data stored in the read only memory module, so that after the further data terminal has transmitted in particular changeable, second address/identification information items being items generated by using a source IP address of the data transmission device and referencing a large area network address to the terminal system and has in return received third address/identification information items, on the basis of a comparison between the first address/identification information items and the second address/identification information items, as a part of the first address/identification information items which can be traced back to the local network, communicates directly with the data terminal by using the receiving unit and the control unit using the third address/identification information items received from the terminal system.

17. Data terminal according to claim 16, wherein Internet Protocol addresses in the form of source/target addresses and authentication data, particularly a password, a user name or a MAC address are configured as the first to the third address/identification information items.

18. A method for identification and/or addressing of a data terminal of a local network, wherein the local network is connected via a data transmission device to a large area network and wherein at least two data terminals of the local network are connected as client to a terminal system as server via the data transmission device, said method comprising:

receiving, at the terminal system, changeable first address/identification information items being items generated by using a source IP address of the data transmission device and referencing a local network address and a large area network address, wherein the terminal system receives the first address/identification information items from at least one first data terminal in response to a triggering event and stores the received first address/identification information items;

receiving, at the terminal system, changeable second address/identification information items being items generated by using a source IP address of the data transmission device and referencing a large area network address, wherein the terminal system receives the second address/identification information items from a second data terminal;

comparing the received second address/identification information items to stored first address/identification items to determine third address/identification information items for the local network; and if the comparing reveals a part of the stored first address/identification information items that corresponds to the second address/identification information items, transmitting, from the terminal system to the second data terminal, a part of the first address/identification information items that can be traced back to the local network as the determined third address/identification information items, wherein the second data terminal communicates directly with the first data terminal with the part of the first address/identification information items transmitted thereto as the third address/identification information items using the third address/identification information items received from the terminal system.

* * * * *